United States Patent [19]

Mihalczo

[11] Patent Number: 5,289,510
[45] Date of Patent: Feb. 22, 1994

[54] TWO-DIMENSIONAL POSITION SENSITIVE RADIATION DETECTORS

[75] Inventor: John T. Mihalczo, Oak Ridge, Tenn.

[73] Assignee: Martin Marietta Energy Systems, Inc., Oak Ridge, Tenn.

[21] Appl. No.: 965,836

[22] Filed: Oct. 23, 1992

[51] Int. Cl.$^5$ .............................................. G21C 17/00
[52] U.S. Cl. ..................................... 376/258; 376/253
[58] Field of Search ............... 376/245, 258, 253, 248; 976/DIG. 227, DIG. 229; 250/370.1, 367, 368, 370.03, 370.05, 370.01

[56] References Cited

U.S. PATENT DOCUMENTS

| | | | |
|---|---|---|---|
| 4,454,424 | 6/1984 | Strauss et al. | 250/390 |
| 4,942,302 | 7/1990 | Koechner | 250/368 |
| 4,960,997 | 10/1990 | Watanabe et al. | 250/368 |

Primary Examiner—Donald P. Walsh
Assistant Examiner—Meena Chelliah
Attorney, Agent, or Firm—Earl L. Larcher; James M. Spicer; Harold W. Adams

[57] ABSTRACT

Nuclear reaction detectors capable of position sensitivity with submillimeter resolution in two dimensions are each provided by placing arrays of scintillation or wave length shifting optical fibers formed of a plurality of such optical fibers in a side-by-side relationship in X and Y directions with a layer of nuclear reactive material operatively associated with surface regions of the optical fiber arrays. Each nuclear reaction occurring in the layer of nuclear reactive material produces energetic particles for simultaneously providing a light pulse in a single optical fiber in the X oriented array and in a single optical fiber in the Y oriented array. These pulses of light are transmitted to a signal producing circuit for providing signals indicative of the X-Y coordinates of each nuclear event.

10 Claims, 4 Drawing Sheets

TWO-DIMENSIONAL POSITION SENSITIVE RADIATION DETECTORS

This invention was made with the support of the United States Government under contract No. DE-AC05-85OR21400 awarded the U. S. Department of Energy. The United States Government has certain rights in this invention.

BACKGROUND OF THE INVENTION

The present invention relates generally to radiation detectors employing scintillation or wave length shifting optical fiber arrays arranged in a two-dimensional X-Y plane for providing signals indicative of the locations of nuclear reactions occurring in the X-Y plane. More particularly, the present invention is directed to such radiation detectors wherein the optical fiber arrays are each provided by a plurality of side-by-side optical fibers with these optical fiber arrays disposed perpendicular to one another and in the X-Y plane and with a planar layer of nuclear reactive material operatively associated with the optical fiber arrays. Each nuclear particle or ray that contacts and reacts with the layer of nuclear reactive material will simultaneously provide a light pulse in a single optical fiber in each optical fiber array with these light pulses together being used to determine the X-Y coordinates of each nuclear reaction with a resolution of less than one millimeter (mm).

Position sensitive radiation detectors are of significant interest in many experimental and production applications. For example, the determination of essentially the precise location of neutron activity in research facilities, including those employing cold and thermal neutron scattering experiments, is often of considerable importance in achieving the goal of the research. Also, in production facilities involving nuclear activity such as in the production of tritium in a nuclear reactor, the dimensional profiles of the reactor target materials are important considerations in the operation of the reactor and the production of the tritium. Further, an accurate determination of fission density distribution in a nuclear reactor is a significant criterion in the design and operation of the reactor. Also, with the storage of fissile material in storage vaults, the imaging of the fissile material stored in each location in the vault would provide a valuable monitoring mechanism.

Various types of position sensitive neutron detectors have been recently developed and are described in the literature such as in the article, "Experience With Position-Sensitive Neutron Detectors at the Intense Pulsed Neutron Source", R. K. Crawford et al, *Nuclear Instruments and Methods in Physics Research*, A299 (1990) pp. 17-24. The position sensitive neutron detectors described in this article include detectors employing $^6$Li glass scintillators in connection with multiple channel photomultiplier arrays and $^3$He proportional counters for providing two-dimensional (X-Y) coordinates of neutron activity with spatial resolutions in the range of about 0.7 to 14.0 mm.

SUMMARY OF THE INVENTION

It is an object of the present invention to provide improved position sensitivity radiation detectors for monitoring nuclear activity with spatial resolutions in two dimensions of less than 1 mm, preferably 0.1 mm or less. Generally, the position sensitive, two-dimensional radiation detectors of the present invention each comprise nuclear reaction sensing means defined by adjacently disposed first and second planar arrays of elongated scintillation or wave length shifting optical fibers oriented perpendicular to one another in X and Y directions. The planar arrays of the optical fibers are each provided by a plurality of elongated optical fibers disposed in a side-by-side relationship. A planar layer of nuclear reactive material is operatively associated with surface regions of the planar arrays of optical fibers corresponding to a substantial length of each of the optical fibers in the first and second planar arrays. A nuclear reaction occurring in the planar layer of nuclear material upon being contacted by a nuclear particle or ray will virtually simultaneously provide a light pulse in a single optical fiber in the array oriented in the X-direction and a light pulse in a single optical fiber oriented in the Y-direction. Circuit means are coupled to each of the optical fibers in each planar array and include coincidence counting means that are adapted to utilize the simultaneous light pulses from the optical fibers for providing a signal indicative of the X-Y coordinates of each nuclear reaction.

The planar layer of nuclear reactive material is characterized by being capable of undergoing a nuclear reaction when contacted by a nuclear particle or ray for providing at least two particles which in some nuclear reactions both particles have active energy and are virtually if not simultaneously discharged from the layer of nuclear reactive material. In other nuclear reactions only one of the two particles produced by the nuclear reaction will have enough active energy to produce light.

In the detector embodiment used for detecting nuclear reaction where the two energetic particles are discharged from the layer of nuclear reactive material, scintillation optical fibers are used in the optical fiber arrays. The planar layer of nuclear reactive material is positional between the first and second planar arrays of the scintillation optical fibers in a contacting relationship therewith. One of the two energetic particles is received by a single scintillation optical fiber in the first planar array and the other energetic particle is received by a single scintillation optical fiber in the second planar array at the nexus of these two optical fibers for virtually simultaneously, if not simultaneously, effecting light pulse producing scintillation reactions in both of these optical fibers contacted by the energetic particles.

In the detector embodiment used for detecting nuclear reactions where only one effective energetic particle is produced in the layer of nuclear reactive material, wave length shifting optical fibers used in the optical fiber arrays and the nuclear reactive material is doped with a phosphor. The planar layer of the nuclear reactive material is placed in contact with the surface regions of only one optical fiber array. The active energy particle will react with the phosphor at the site or essentially at the site of the nuclear reaction to produce a light pulse which passes from the layer of nuclear reactive material into a single fiber in each of the optical fiber arrays for providing light pulses therein which are transmitted to the circuit means used for determining the X-Y coordinates of each nuclear reaction.

Another object of the present invention is to provide position sensitive radiation detectors wherein each nuclear reaction of a plurality of sequential nuclear reactions is detected with the X-Y location of each reaction determined with a resolution in the order of less than about 1 mm, preferably about 0.1 mm or less. This relatively high level of spatial resolution provided by the subject detectors is limited only by the diameter or cross-sectional thickness of the scintillation or wave length shifting optical fibers employed in each of the optical fiber arrays.

A further object of the present invention is to provide position sensitive radiation detectors for monitoring neutron activity in two dimensions by forming the planar layer of nuclear reactive material from enriched $^6$Li, preferably as $^6$LiF.

A still further object of the present invention is to provide circuit means for utilizing the light pulses from the optical fibers to determine the X-Y location of each nuclear reaction with circuit means including pulse amplifying means having position analyzing means associated therewith adapted to provide signals from the planar arrays of optical fibers to coincidence counting means that are indicative of the X and Y location of the particular nuclear reaction.

A still further object of the present invention is to provide position sensitive two-dimensional radiation detectors wherein the nuclear reaction sensing means comprises a plurality of stacked pairs of adjacently disposed first and second planar arrays of elongated scintillation or wave length shifting optical fibers oriented in the X and Y directions. In one embodiment of the detector a planar layer of the selected nuclear reactive material is disposed between the first and second planar arrays of scintillation optical fibers in each pair of the plurality of stacked pairs of scintillation optical fiber arrays. In another embodiment of the detector a planar layer of the selected nuclear material containing a phosphor is disposed between each pair of the plurality of stacked pairs of wave length shifting optical fiber arrays. The optical fibers in the same X or Y location in the plurality of stacked pairs of the optical fiber arrays in both of these embodiments of the detector are coupled to a common location on the pulse amplifying means for providing a light pulse thereto that is indicative of the location of the nuclear reaction in the X or Y direction regardless of the location in the Z direction in the plurality of stacked pairs of optical fiber arrays in which the nuclear reaction occurs.

By employing a plurality of optical fibers in each planar array, the signals to the pulse amplifying means provide for the X-Y coordinates of sequential nuclear events in a manner with significantly more spatial resolution than that provided by previous position sensitive detectors such as described in the aforementioned article. In the present invention the instrumentation used for determination of the spatial resolution of the nuclear events is reduced by a factor of n/2 over that required in previously known radiation detectors wherein $n^2$ is the number of monitoring positions of interest in the two-dimensional X-Y plane.

Other and further objects of the present invention will become obvious upon an understanding of the illustrative embodiments about to be described or will be indicated in the appended claims, and various advantages not referred to herein will occur to one skilled in the art upon employment of the invention in practice.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

Figure 5:
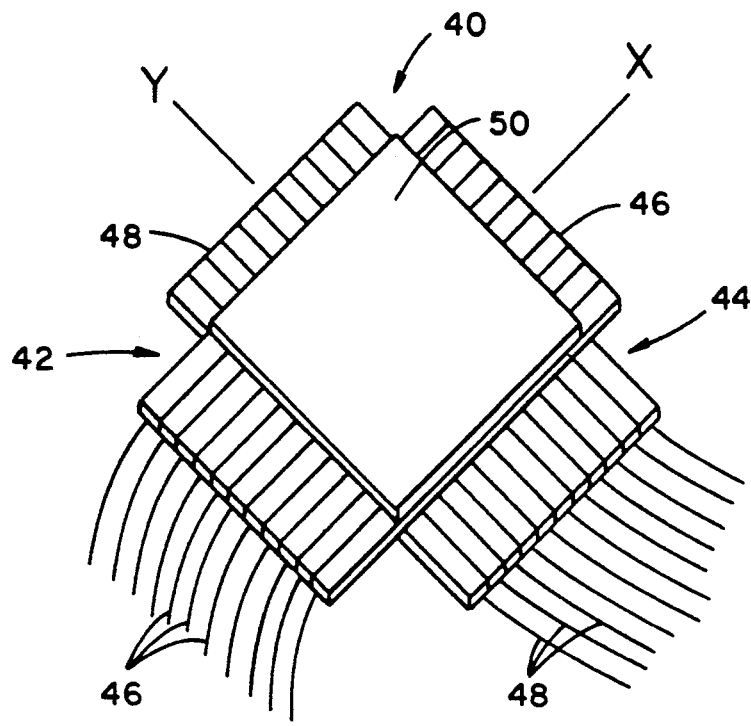
FIG. 5 is a schematic perspective view showing another embodiment of the position sensitive detectors of the present invention utilizing two planar arrays of wave length shifting optical fibers disposed in a two dimensional X-Y orientation with a planar layer of nuclear reactive material in contact with surface regions on only one of the optical fiber arrays.
Figure 6:
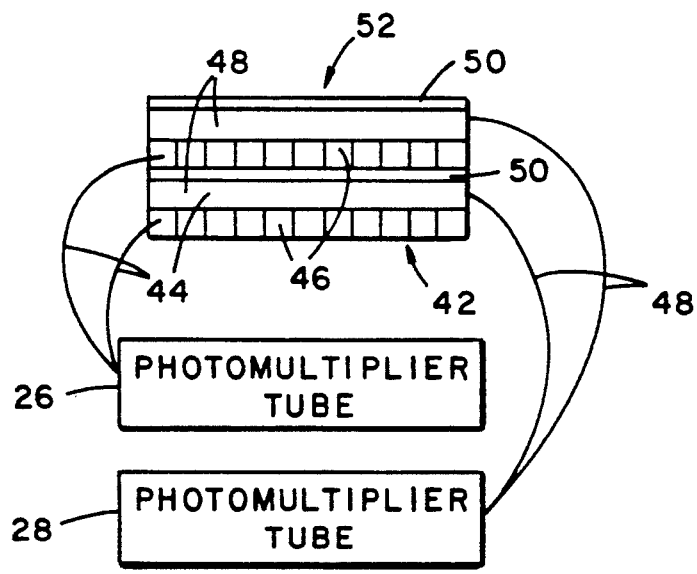
FIG. 6 is an elevational view showing a modification of the detector embodiment of FIG. 5 as provided by several stacked pairs of wave length shifting optical fiber arrays with the planar layer of phosphor-doped nuclear reactive material placed between each pair of the stacked optical fiber arrays.

As described in assignee's co-pending U.S. Patent application entitled, "On-Line Tritium Production Monitor", Ser. No. 07/924,125, filed Aug. 3, 1992, the detection of nuclear activity is achieved by coating an scintillation optical fiber with a nuclear reactive material that produces two particles with active energy upon being contacted by a nuclear particle or ray. One of these energetic particles is received by the optical fiber for producing a pulse of scintillation light therein which is transmitted via a photomultiplier tube to a pulse counting circuit. The coating on this optical fiber can be formed of enriched $^6$Li so that upon being contacted by a neutron a nuclear $^6$Li(n$\alpha$)T reaction is induced in the coating for producing energetic $\alpha$ particles and tritons which are ejected from the coating in directions 180° apart from one another with one of the energetic particles entering the optical fiber to provide therein the pulse of scintillation light. Inasmuch as the scintillation optical fibers, the coatings on the optical fibers, and the energetic particle producing reactions described this co-pending U.S. patent application generally correspond to the type of optical fibers, the planar layer of nuclear reactive materials contained between the planar arrays of the side-by-side optical fibers oriented in an X-Y plane, and the scintillation light producing reactions in the planar layers of nuclear reactive material as employed in the present invention, especially in the embodiment of FIGS. 1-4 of the present invention, this co-pending U.S. patent application is incorporated herein by reference. However, it will appear clear that the embodiments of the nuclear reactive detectors of the present invention as shown in FIGS. 1-4 and FIGS. 5 and 6 differ considerably from the coated optical fiber arrangement described in assignee's aforementioned patent application which provides of position sensitivity in only one direction. In the present invention the X-Y orientation of the planar arrays of the side-by-side optical fibers with the planar layer of nuclear reactive material therebetween as in the embodiment of FIGS. 1-4 or in contact with one of the X-Y arrays of optical fibers as in the embodiment of FIGS. 5 and 6, provides position sensitivity in two-dimensions, i.e., in both the X and the Y direction, for determining essentially the exact X-Y coordinates of each of a plurality of sequentially occurring nuclear events.

A preferred utilization of the nuclear reaction detectors of the present invention is directed to the position sensitive detection of nuclear reactions between neutrons and a planar layer of $^6$Li with submillimeter resolution in two dimensions. Thus, while the description below is primarily directed to neutron detectors having position sensitivity in two directions, it is to be understood that the planar layer of $^6$Li can be replaced by another nuclear reactive material with or without a phosphor dopant. For example, the planar layer of nuclear reactive material can be formed of a $^{10}$B compound so that the location of $^{10}$B $(n\alpha)$ reactions can be determined in a position sensitive manner in two dimensions, or of a $^{235}$U compound for a position sensitivity determination of fission density distribution such as in a reactor or a storage vault for fissile material, or of a $^{238}$U compound for yielding the two dimensional locations of fast fission occurrences in a nuclear reactor. Also, if desired the planar layer of the $^6$Li used for neutron detection can be replaced by compounds of elements other than $^6$Li that are capable of reacting with neutrons to produce one or more energetic particles for providing pulses of light in the optical fibers of the optical fiber arrays.

Figure 1:
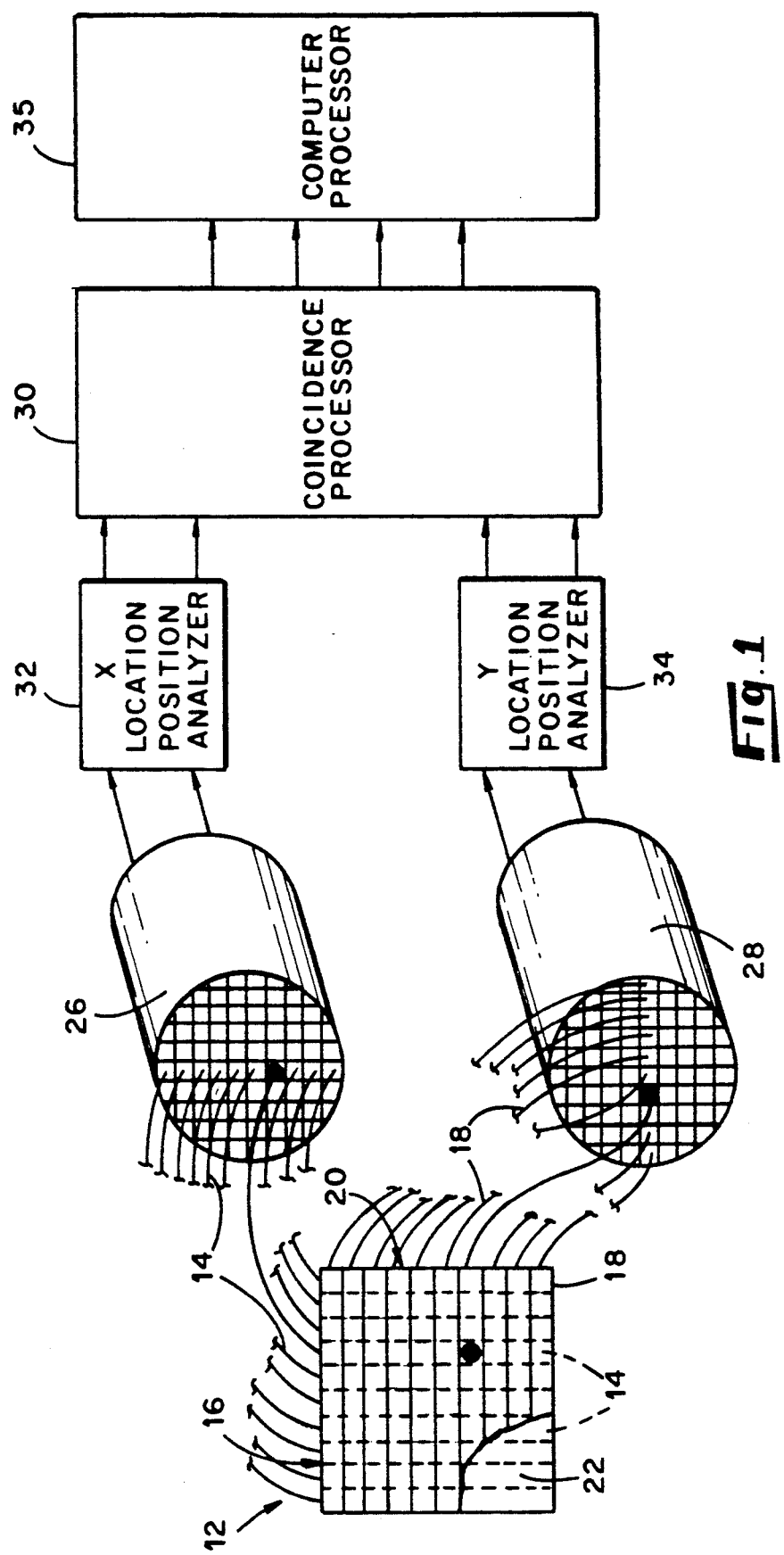
FIG. 1 is a schematic view, partially broken away, showing an embodiment of the position sensitive radiation detectors of the present invention utilizing two planar arrays of scintillation optical fibers disposed in a two-dimensional X-Y orientation with a planar layer of nuclear reactive material therebetween and with the optical fibers in each planar array coupled to circuit means including pulse amplifying means and coincidence counting means.
Figure 2:
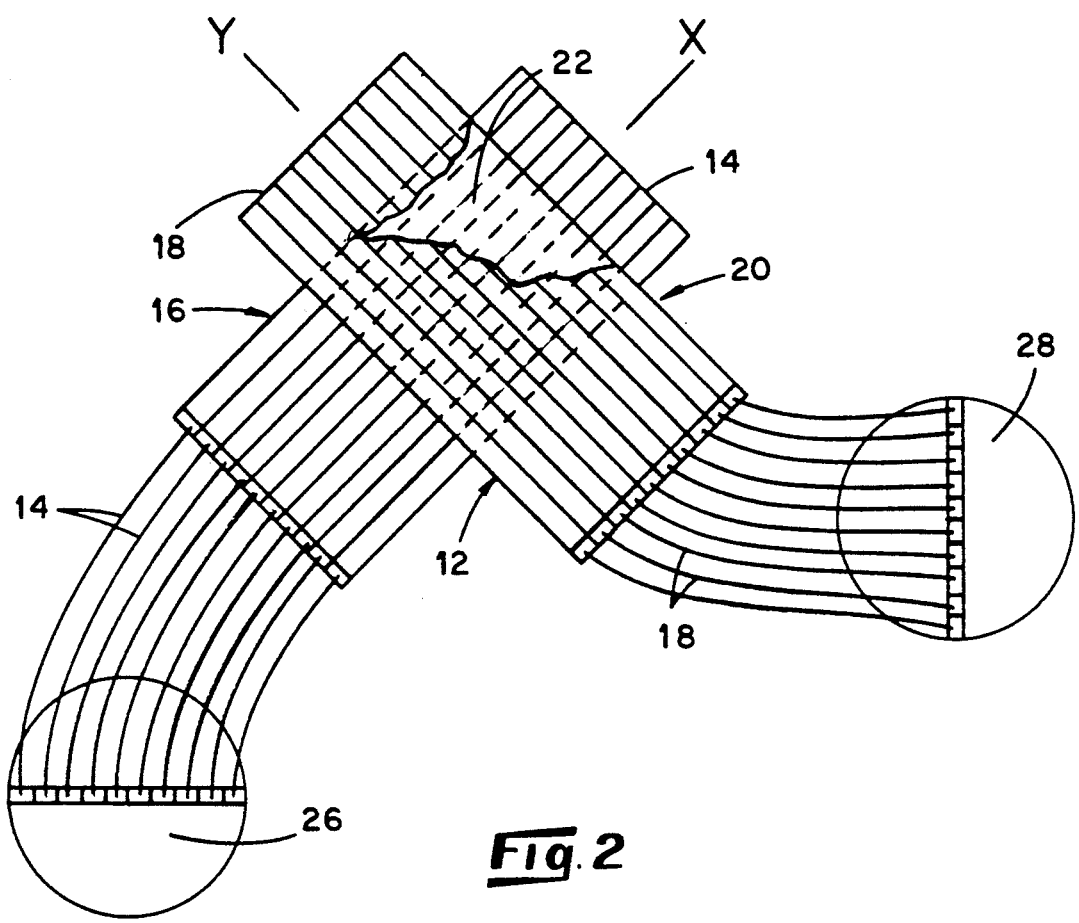
FIG. 2 is a schematic perspective view, partially broken away, showing the nuclear reaction sensing assembly formed of two arrays of side-by-side rectangularly-shaped scintillation optical fibers each coupled to positions on photomultiplier tubes and with the two planar arrays disposed in a two-dimensional X-Y orientation with a planar layer of nuclear reactive material contained therebetween.
Figure 3:
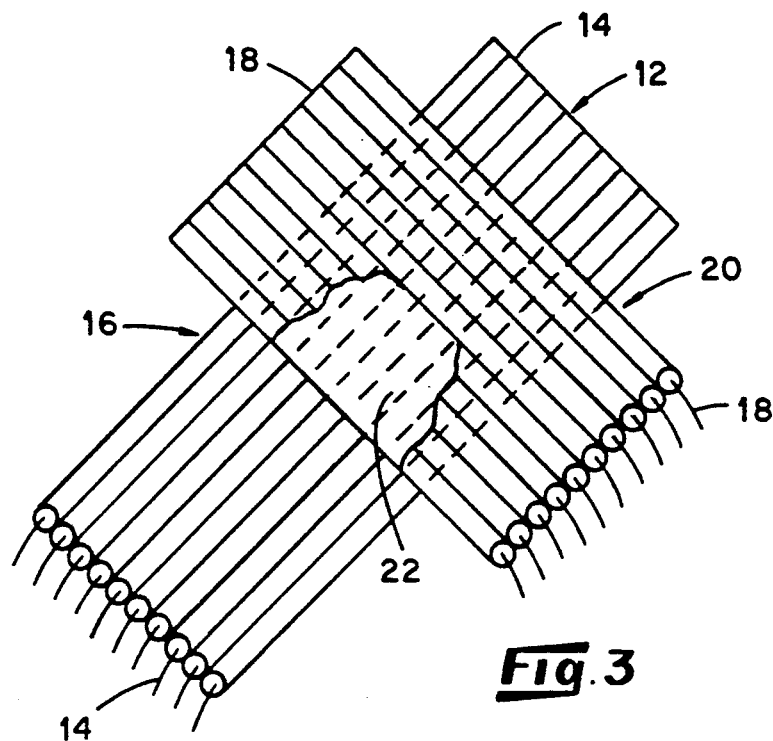
FIG. 3 is a schematic perspective view, partially broken away, illustrating the embodiment of FIG. 1 wherein the optical fibers in each planar array are of a cylindrical configuration.
Figure 4:
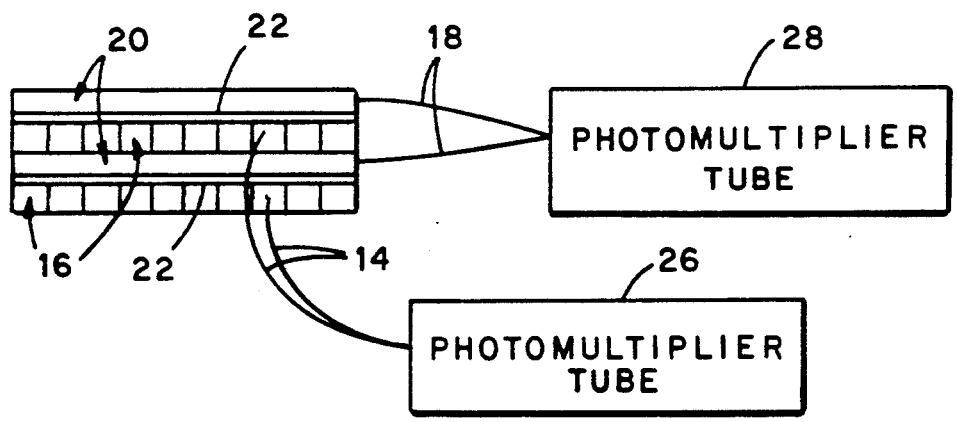
FIG. 4 is an elevational view showing a modification of the embodiment of FIG. 1 wherein several stacked pairs of the planar optical fiber arrays with of the optical fiber arrays in adjacent pairs of optical fiber arrays oriented in X-Y planes and with a layer of nuclear reactive material contained between the optical fiber arrays defining each pair of optical fiber arrays.

With reference to the embodiment of the detector illustrated in FIGS. 1-4, the detector 10 incorporates a nuclear reaction sensing assembly 12 for providing the position sensitive detection of nuclear events in two dimensions. This nuclear reaction sensing assembly 12 is shown formed of a first plurality of commercially available glass or plastic scintillation optical fibers 14 arranged side-by-side in a single plane to form a first planar array 16 of optical fibers which, for the purpose of this description, is shown oriented in the X direction of a two-dimensional X-Y plane. A second plurality of optical fibers 18 similar in construction and length to the optical fibers 14 are arranged side-by-side in a single plane to form a second planar array 20 of optical fibers oriented in the Y direction or at 90° to the optical fiber array 16. A planar layer 22 of $^6$Li, preferably $^6$LiF, as best shown in FIGS. 2-4, is positioned between the two planar optical fiber arrays 16 and 20 with this two-dimensional layer 22 of $^6$LiF extending a sufficient distance in both the X and the Y directions so as to be between and in contact with surface regions of the optical fibers 14 and 18 at all of the nexuses formed by the crossing optical fibers. For example, if two optical fiber arrays 16 and 20 contained ten optical fibers, then the planar layer 22 of $^6$LiF would be of an area sufficiently large so as to be in contact with the optical fibers 14 and 18 at the one hundred nexuses or cross-over points. Inasmuch as the nuclear reaction sensing assembly 12 can be readily fabricated with various X and Y dimensions, it is expected that this assembly 12 of optical fiber arrays can be positioned in any appropriate location within a nuclear reactor or in an experimental configuration wherein neutrons or other nuclear particles or rays are produced.

The planar layer 22 of $^6$LiF, preferably with the $^6$Li enriched to 95%, positioned between the two optical fiber arrays 16 and 20 is of a maximum thickness less than about 10 microns so that when a neutron contacts the layer 22 the resulting nuclear reaction ($^6$Li$(n\alpha)$T) will eject the energetic $\alpha$ particle and the triton from the layer 22 in opposite directions. These energetic particles simultaneously enter a single optical fiber in each optical fiber array 16 and 20 to produce a pulse of scintillation light in only these two optical fibers. These light pulses propagate to the end of the optical fibers 14 and 18 which are coupled to a suitable reaction-position signal producing circuit 24 which includes light amplifying means such as a photomultiplier tubes 26 and 28 or an array of photo diodes (not shown) and a suitable coincidence processor counting circuit 30 for providing an output signal indicative of the location of the nuclear reaction in a two-dimensional plane.

The photomultiplier tubes 26 and 28 used to individually receive the light pulses from the optical fibers 14 and 18 may be provided by using an array of individual photomultiplier tubes as shown in the aforementioned publication or by using photomultiplier tubes having position sensitivity such as provided by crossed wire anodes. One such commercially available photomultiplier tube with multiple position sensitive locations for receiving signals is the "Hamamatsu R2486 Series Type" photomultiplier tube as described in the publication "Position-Sensitive Photomultiplier Tubes with Crossed Wire Anodes, R2486 Series", *Hamamatsu Technical Data*, August 1989, Hamamatsu Corporation, 360 Foothill Road, Ridgewater, N.J. Such position sensitive photomultiplier tubes using crossed wire anodes as well as arrays of individual photo diodes or photomultiplier tubes, such as described in the aforementioned publication, are capable of providing over 200 useful locations of signal. In accordance with the present invention, each optical fiber 14 of the planar array 16 oriented in the X direction would be attached to a single photomultiplier tube or to a selected location on the position sensitive photomultiplier tube 26 while each optical fiber 18 of the planar 20 oriented in the Y direction would be coupled to a selected location on the position sensitive photomultiplier tube 28. By employing such photomultiplier tubes 26 and 28, the X-Y position of each nuclear event may be accurately determined by using X and Y location position analyzers 32 and 34, which are respectively coupled to the photomultiplier tubes 26 and 28 and are used for determining the exact X and Y positions on the photomultiplier tubes 26 and 28 receiving the light pulse generated from a single nuclear reaction. Such a position analyzer is commercially available for use with the aforementioned "Hamamatsu R2486 Series Type" photo amplifier tube from the Hamamatsu Corporation noted above as "Position Analyzer C1816." The coincidence counting circuit 30 can be provided by a collection of 1, 20 coincidence circuit modules such as the ORTEC Model OR/102B, available from EG&G ORTEC, Oak Ridge, Tenn., or an equivalent counting module. For a relatively large number of optical fiber arrays or optical fibers in each array the use of conventional coincident counting techniques and systems may be more space efficient. The coincidence counting circuit 30 is coupled to the X and Y position analyzers 32 and 34 for associating the X and Y fiber locations where the nuclear reactions occur as a function of time. Thus, by using coincidence processing techniques, the timed association of the light pulses from specific X and Y optical fiber locations is used to accurately derive the exact location of the X-Y intersection of the two optical fibers 14 and 18 where each nuclear reaction occurred. A suitable data processor such as a computer processor 35 is shown coupled to the coincidence processor 30 of analyzing the signals therefrom for data indicative of the X-Y locations of the nuclear events.

The optical fibers 14 and 18 employed in the optical fiber arrays are preferably fast scintillation plastic fibers formed of a polymer such as polystyrene. Such plastic scintillation optical fibers are available from Bicron Corporation, Newberry, Ohio 44065. These commercially available plastic scintillation fibers can produce pulses with a total pulse width of less than 20 nsec. Alternatively, the optical fibers 14 and 18 can be formed of glass such as fused silica. The glass or plastic optical fibers utilized in each optical fiber array 16 and 20 may be of any desired length with the layer 22 of nuclear reactive material fully contacting all the intersections or cross over points provided by the optical fibers in both optical fiber arrays 14 and 20 so as to provide a two-dimensional nuclear reaction detecting assembly of a selected size. Moreover, the number of optical fibers used in the optical fiber arrays 16 and 20 is unlimited by the positions at the photomultiplier tubes 26 and 28 since more than one such photomultiplier tube can be used with any optical fiber array containing greater than 200 optical fibers.

As shown in FIG. 2, the optical fibers are of a generally rectangular configuration so that when they are placed in an abutting side-by-side relationship, a greater area of each fiber is contacted by the layer 22 of nuclear reactive material at each nexus of the optical fibers. Alternatively, as shown in FIG. 3, the optical fibers 14 and 18 may be of a cylindrical cross section. In using either rectangular or cylindrical optical fibers, the surface area of the fibers in contact with the layer 22 of nuclear reactive material at the nexuses of the optical fibers is sufficient to provide accurate position sensitivity of the nuclear event with submillimeter resolution in two dimensions. The position sensitivity of the nuclear reaction detector system 12 of the present invention is limited only by the cross-sectional thickness of the glass or plastic optical fibers which can be readily formed with a cross-sectional thickness or diameter of less than 0.1 mm so that spatial resolution of the sequential nuclear reactions can be provided in the X-Y plane with a point accuracy to less than 0.1 mm.

As shown in FIG. 4, several pairs of optical fiber arrays disposed in the X and Y directions are placed together in the Z direction to provide a stacked assembly 36 of pairs of X and Y optical fiber arrays 16 and 20 with a layer 22 of nuclear reactive material contained between each X-Y pair of optical fiber arrays in the stacked assembly 36 so as to provide a level of X-Y sensitivity over a greater volume of a nuclear reactor, fissile storage vault, or experimental apparatus than can be provided by a single X and Y construction of optical fiber arrays as shown in FIGS. 1-3. When using such a stacked assembly 36, the individual optical fibers in the stacked pairs of optical fiber arrays that are located in common locations in the X direction and the Y direction are coupled at the same point to the photomultiplier tubes 26 and 28, respectively, so that a nuclear event occurring in any of the paired X-Y optical fiber arrays in the stacked assembly 36 will provide an indication or signal indicative of the X-Y position of the nuclear event to the coincidence counting circuit 30.

With reference to the embodiment of the detector of the present invention illustrated in FIG. 5, the nuclear reaction sensing assembly 40 provides for the position sensitive detection of nuclear events in a two-dimensional X-Y plane as in the detector embodiment of FIGS. 1-4. In this embodiment the nuclear reaction sensing assembly 40 is shown formed of two planar arrays 42 and 44 of wave length shifting optical fibers with one array oriented in the X-direction and with the other array oriented in the Y-direction. Each array 42 and 44 of optical fibers is formed of a plurality of side-by-side wave length shifting optical fibers 46 and 48, respectively. The planar layer 50 of nuclear reactive material is provided by nuclear reactive materials of the type previously described for use in the nuclear reaction sensing assembly 12 of the detector embodiment of FIGS.. 1-4 except for being doped with a suitable phosphor. This planar layer 50 of the phosphor-doped nuclear reactive material is shown placed over the optical fiber array 42 in a contacting relationship with outer surface regions of the optical fibers 46. Also, as shown, the planar layer 50 of the phosphor-doped nuclear reactive material is coextensive with the lengths of the optical fibers 46 in the optical fiber array 42 that are in a contacting nexus-forming relationship with the optical fibers 48 in optical fiber array 44.

This embodiment of the detector is used for the position sensitive detection of nuclear reactions where only one of the two particles produced from the reactions is provided with sufficient active energy to escape from the layer of nuclear reactive material. Thus, in order to assure that the X-Y coordinates of each nuclear reaction can be determined when only one energetic particle is produced by each nuclear reaction, the nuclear reactive material is doped with a phosphor which reacts with the energetic particle to produce a light pulse in the layer 50 at the nuclear reaction site. This light pulse will be emitted from the nuclear reactive material and virtually simultaneously pass into a single optical fiber 46 in the optical fiber array 42 and a single optical fiber 46 in the optical fiber array 44 at the nexus of these two optical fibers.

The light pulses provided in the single wave length shifting optical fibers in each array 42 and 44 are transmitted therethrough to a reaction-position signal producing circuit corresponding to previously described circuit 24 used in connection with the detector embodiment of FIGS. 1-4.

The wave length shifting fibers 46 and 48 are of the type capable of transmitting light such as at frequencies in the green or blue light spectrum and are of rectangular or round configurations with cross sections or diameters less than 1 mm, preferably less than 0.1 mm. Wave length shifting optical fibers having such features are available from the above mentioned Bicron Corporation.

The nuclear reactive material is doped with a suitable phosphor such as calcium tungstate, magnesium tungstate, zinc silicate, zinc sulfide, cadmium tungstate, and cadmium borate. The concentration of the phosphor dopant in the layer of nuclear reactive material provided by a compound such as $^6$LiF or glass or plastic scintillators containing $^{235}$U, $^{10}$B, or $^{238}$U is sufficient to assure that an adequate distribution of phosphor is obtained throughout the layer of nuclear reactive material to be contacted by and react with the energetic particle produced from each nuclear reaction. Normally, a concentration of the phosphor dopant in the range of about 100 ppm to about 2 percent by volume is adequate to achieve this objective.

Inasmuch as the light pulse is produced within the layer 50 of nuclear reactive material the thickness of this layer is not as critical to the successful operation of the detector embodiment of FIG. 5 as it is to that of the detector embodiment of FIGS. 1–4. In this nuclear reaction sensing assembly 40 the layer 50 of nuclear reactive material can be of a thickness of up to about one half the diameter or cross section of the fibers in order to maintain the spatial resolution and assure that the light will escape from the layer 50 of nuclear reactive material.

With reference to FIG. 6, the detector embodiment of FIG. 5 is modified by placing several pairs of the wave length shifting optical fiber arrays 42 and 44 together in the Z-direction to provide a stacked assembly 52 of pairs of X and Y optical arrays. A layer 50 of the phosphor-doped nuclear reactive material is placed between each of the adjacent pairs of optical fiber arrays 42 and 44. As with the detector embodiment of FIG. 4 the individual optical fibers in the stacked pairs of optical fiber arrays that are located in common locations in the X direction and the Y direction are coupled at the same point to the photomultiplier tubes 26 and 28, respectively, so that a nuclear event occurring in any of the paired X-Y optical fiber arrays 42 and 44 in the stacked assembly 52 will provide an indication or signal indicative of the X-Y position of the nuclear event to the coincidence counting circuit.

By employing the nuclear reaction detecting assembly 12 of the present invention and utilizing a coincidence counting circuit operatable at relatively high rates of greater than about $10^6$ counts per second, the number of instruments in the signal producing circuit 24 required for the position sensitive measurements of nuclear events by using techniques described in the aforementioned publication is reduced by a factor of n/2 wherein $n^2$ is the number of positions of interest in the X-Y plane. The techniques described in the aforementioned article when used in $10 \times 10$ array requires $n^2$ electronics whereas the present invention only requires the use of 2n electronics. Thus, for a $10 \times 10$ array defined by ten optical fibers in each optical fiber array, one-hundred individual photomultiplier tubes or tube positions would be required using previously known techniques whereas in the present invention a $10 \times 10$ array with ten optical fibers in each optical fiber array 16 and 20 of FIGS. 1–4 or 42 and 44 of FIGS. 5 and 6 would require only twenty photomultiplier tubes or tube positions which could easily produce pulses at $10^7$ rates.

It will be seen that by using the nuclear reaction detectors of the present invention, the X and Y locations of a relatively high number of sequentially occurring nuclear events can be readily determined with submillimeter resolution in a manner considerably more efficient than heretofore available. Further, the determination of the X and Y locations of the nuclear events with a resolution of less than 0.1 mm is feature of the present invention not previously obtainable.

What is claimed is:

1. A position sensitive, two dimensional radiation detector comprising nuclear reaction sensing means defined by adjacently disposed first and second planar arrays of elongated optical fibers oriented perpendicular to one another in X and Y directions and with said first and second planar arrays each being provided by a plurality of elongated optical fibers disposed in an abutting side-by-side relationship, a planar layer of nuclear reactive material disposed between the first and second optical fiber arrays in a contacting relationship with surface regions extending over a substantial length of each of the optical fibers in at least one of the first and second optical fiber arrays, said layer of nuclear reactive material being characterized by undergoing a nuclear reaction therein when contacted by a nuclear particle or ray for providing in said layer of nuclear reactive material at least two energetic particles that are virtually simultaneously discharged from said layer with one of said energetic particles being received by one of the optical fibers in the first planar array and another of said energetic particles being received by one of the optical fibers in the second planar array for essentially simultaneously effecting light pulse producing scintillation reactions in both of the optical fibers contacted by the energetic particles for providing said light pulse in the single optical fiber in each optical fiber array, and circuit means including coincidence counting means adapted to receive the light pulses from both of the single optical fibers for providing a signal indicative of the coordinates of said nuclear reaction in said X and Y directions.

2. A position sensitive, two dimensional radiation detector as claimed in claim 1, wherein the optical fibers in the first and second planar arrays are each of a rectangular or cylindrical cross section, and wherein each optical fiber is of a cross-sectional thickness of less than about 1 millimeter for determining the position of the nuclear reaction in an X-Y plane within less than about 1 millimeter in each direction.

3. A position sensitive, two dimensional radiation detector as claimed in claim 2, wherein the cross sectional thickness of each optical fiber is less than about 0.1 millimeter for determining the position of the nuclear reaction in the X-Y plane within less than about 0.1 millimeter in each direction.

4. A position sensitive, two dimensional radiation detector as claimed in claim 1, wherein said circuit means comprises pulse amplifying means coupled to each of said optical fibers in the first and second planar arrays with said pulse amplifying means having means associated therewith adapted to provide a signal from each planar array of optical fibers to said coincidence counting means that is indicative of the X and Y locations of the nuclear reaction.

5. A position sensitive, two dimensional radiation detector as claimed in claim 4, wherein said pulse amplifying means comprises photomultiplier tube means.

6. A position sensitive, two dimensional radiation detector as claimed in claim 1, wherein said nuclear reaction sensing means comprises a plurality of stacked pairs of adjacently disposed first and second planar arrays of elongated scintillation optical fibers oriented in the X and Y directions, wherein a planar layer of said nuclear reactive material is disposed between the first and second planar arrays in each pair of said plurality of stacked pairs of first and second optical fiber arrays, and wherein optical fibers in the same X or Y location in each pair of said plurality of pairs of first and second optical fiber arrays are coupled to a common location on said circuit means for providing a signal indicative of the coordinates of the nuclear reaction in said X and Y directions regardless of in which pair of optical fiber arrays in said plurality of stacked pairs of optical fiber arrays the nuclear reaction occurs.

7. A position sensitive, two dimensional radiation detector as claimed in claim 1, wherein said layer of nuclear reactive material comprises $^6$Li, $^{10}$B, $^{235}$U, or $^{238}$U.

8. A position sensitive, two dimensional radiation detector as claimed in claim 7, wherein said layer of nuclear reactive material is of a thickness substantially corresponding to the shortest range of travel of any of said energetic particles.

9. A position sensitive, two dimensional radiation detector as claimed in claim 8, wherein the layer of nuclear reactive material comprises $^6$Li, wherein the nuclear particle or ray providing the reaction with the layer of nuclear reactive material is a neutron for producing a $^6$Li(n$\alpha$)T reaction with the layer of nuclear reactive material, wherein said at least two energetic particles are provided by an $\alpha$ particle and a triton, and wherein said thickness of said layer of $^6$Li is up to a thickness corresponding to the range of the $\alpha$ particle.

10. A position sensitive, two dimensional radiation detector as claimed in claim 9, wherein the layer of nuclear reactive material consists essentially of $^6$LiF, and wherein said thickness of said layer of nuclear reactive material is up to about 10 microns.

* * * * *